United States Patent [19]

Noda et al.

[11] Patent Number: 5,317,142
[45] Date of Patent: May 31, 1994

[54] AUTOMATIC FOCUSING APPARATUS WHICH REMOVES LIGHT REFLECTED BY A LOWER SURFACE OF A SAMPLE

[75] Inventors: Hiroaki Noda, Tokyo; Shinichi Dosaka, Kanagawa; Hiroshi Kurosawa, Tokyo, all of Japan

[73] Assignee: Olympus Optical Co., Ltd., Tokyo, Japan

[21] Appl. No.: 975,699

[22] Filed: Nov. 13, 1992

[30] Foreign Application Priority Data

Nov. 18, 1991 [JP] Japan .................. 3-301795

[51] Int. Cl.$^5$ .............................. G02B 23/06
[52] U.S. Cl. ................... 250/201.4; 250/201.7; 250/201.3
[58] Field of Search ............... 250/201.2, 201.3, 201.4, 250/204, 216, 571, 572, 562; 356/376; 354/402, 406, 409

[56] References Cited

U.S. PATENT DOCUMENTS

| | | | |
|---|---|---|---|
| 4,496,832 | 1/1985 | Sakai et al. | 250/201.2 |
| 5,033,856 | 7/1991 | Nose et al. | 356/376 |
| 5,162,641 | 11/1992 | Fountain | 250/201.2 |

FOREIGN PATENT DOCUMENTS

| | | |
|---|---|---|
| 2102922 | 9/1972 | Fed. Rep. of Germany . |
| 58-217909 | 12/1983 | Japan . |
| 60-42725 | 3/1985 | Japan . |

*Primary Examiner*—David C. Nelms
*Assistant Examiner*—John R. Lee
*Attorney, Agent, or Firm*—Frishauf, Holtz, Goodman & Woodward

[57] ABSTRACT

The automatic focusing apparatus of this invention focuses the measuring beam emitted from a light source on a sample through one side of the pupil of an objective lens, causes light reflected by the sample to pass through the pupil of the objective lens again, focuses the light passing through the pupil of the objective lens on a light-receiving unit, and detects the spot position of the focused light. Especially, this automatic focusing apparatus has a first light-shielding member for shielding light reflected by the lower surface of a transparent thin plate in the vicinity of the focal point of the light reflected by the lower surface of the transparent thin plate, or a second light-shielding member for transmitting therethrough only light reflected by the upper surface of the transparent thin plate in the vicinity of the focal point of the light reflected by the upper surface of the transparent thin plate.

12 Claims, 7 Drawing Sheets

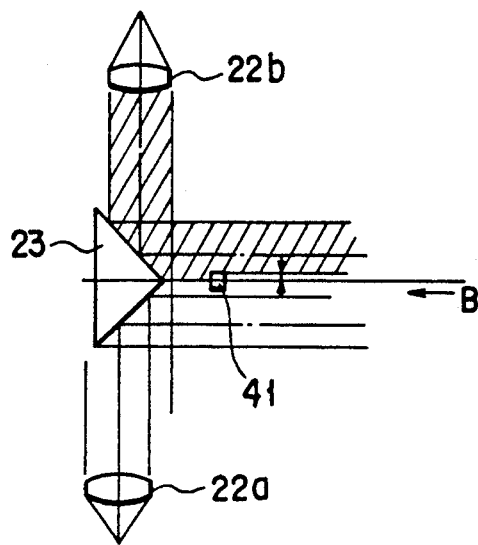
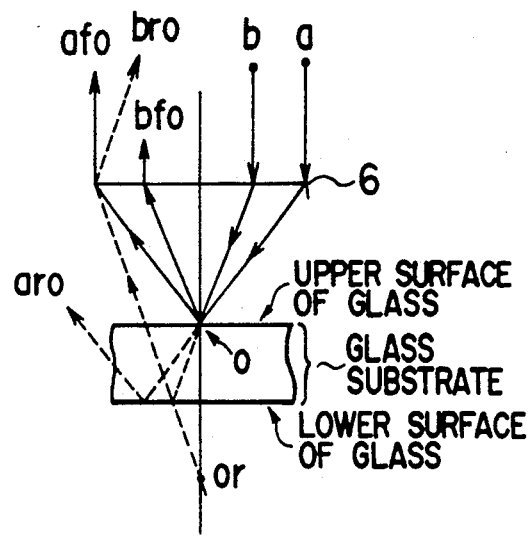
FIG. 5
FIG. 7
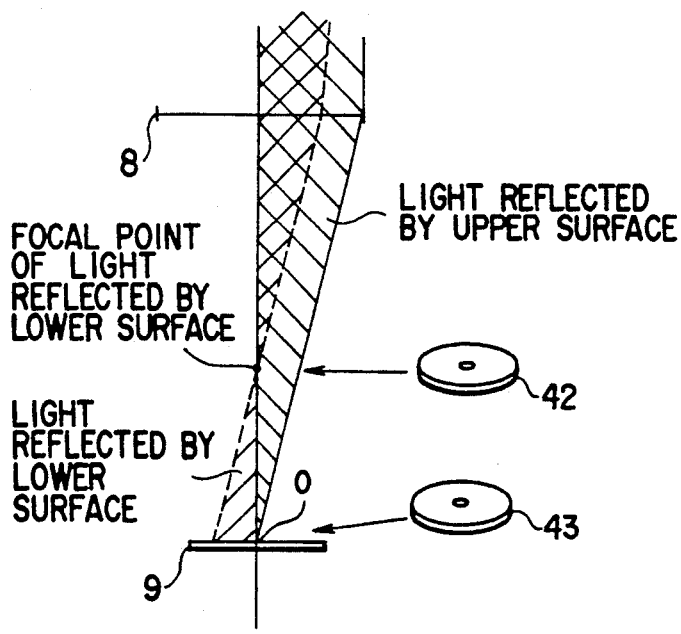
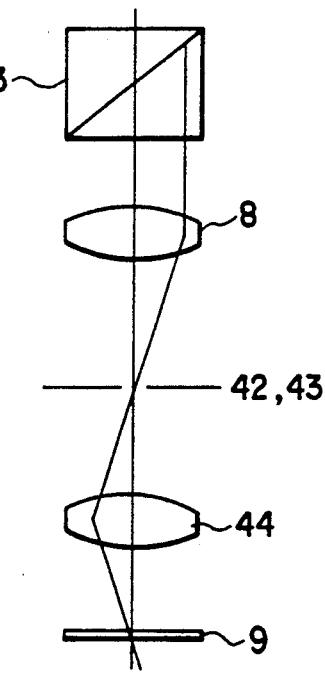
FIG. 6A
FIG. 6B

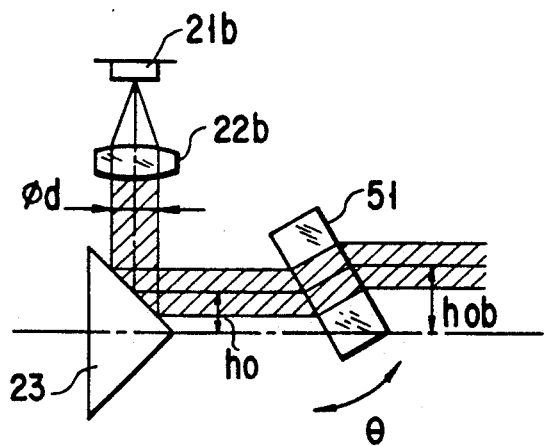
F I G. 14
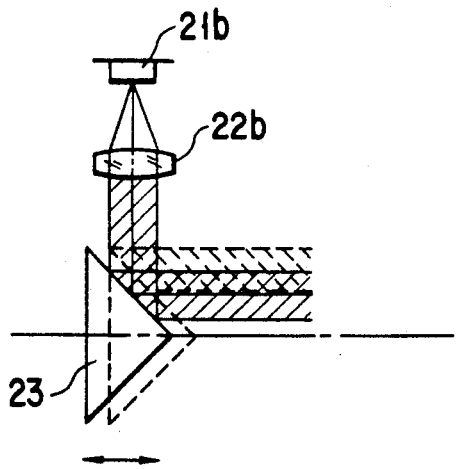
F I G. 15
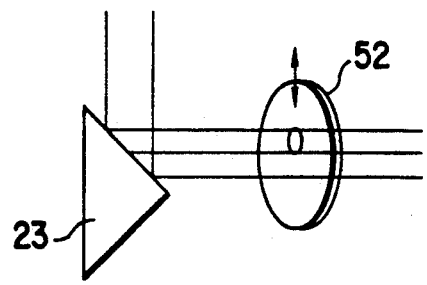
F I G. 16

AUTOMATIC FOCUSING APPARATUS WHICH REMOVES LIGHT REFLECTED BY A LOWER SURFACE OF A SAMPLE

BACKGROUND OF THE INVENTION

Field of the Invention

The present invention relates to an automatic focusing apparatus for a microscope, optical measuring equipment, and the like, which automatically brings an observation optical system used for observation of a transparent thin sample into an in-focus state.

Description of the Related Art

When an aluminum resist oxide film or the like on a silicon wafer is to be observed with an optical microscope, a measuring beam emitted from the light source is focused on the resist oxide film through an objective lens. Light reflected by the resist oxide film is received by a light-receiving unit through the objective lens. The light-receiving unit generates a position signal representing a position where the reflected light forms a spot, and the main unit of the apparatus discriminates the focusing state from the position signal and adjusts the focal point.

A technique related to an automatic focusing apparatus of this type is disclosed in, e.g., Published Unexamined West German Patent Application No. 2,102,922 and Published Unexamined Japanese Patent Application Nos 58-217909 and 60-42725.

FIG. 8 shows the basic optical system of a conventional automatic focusing apparatus.

In this focusing apparatus, light emitted from a measuring light source 1 is converted into a parallel beam by a collimator lens 2. The parallel beam passes through a polarizing beam splitter 3 and a λ/4 plate 4 to enter the observation optical path by a dichroic mirror 5. The parallel beam then passes through one side of the pupil of an objective lens 6 as the measuring beam and is focused on a sample 7.

Light reflected by the sample 7 passes through the other side of the pupil of the objective lens 6, is reflected by the dichroic mirror 5, and is incident on the polarizing beam splitter 3 through the λ/4 plate 4. The parallel beam reflected by the polarizing beam splitter 3 is focused on a light-receiving unit 9 through an image formation lens 8.

When the spot of the measuring light emerging from the objective lens 6 is not precisely located on the sample 7, that is, in the front- or rear-focus state, light reflected by the sample 7 is focused in front of or behind the light-receiving unit 9 by the image formation lens 8. FIG. 9 shows this state.

The position of the spot on the light-receiving unit 9 is moved as shown in FIG. 10A in accordance with the defocusing amount of the observation optical system. FIG. 10B shows the light intensities of the respective reflected light spots corresponding to the defocusing amounts. In the front- or rear-focus state, the focal point on the light-receiving unit 9 is moved in the lateral direction.

In the conventional focusing apparatus, the position of barycenter of the beam is used as the function of focusing. That is, in FIG. 10A, assuming that reference symbol Xo indicates an in-focus position, barycenter positions Xn(s) in the front- and rear-focus states are obtained, the distance from Xn to Xo is converted into the moving distance in front of and behind the objective focal plane of the sample 7, and a focusing operation is performed for this moving distance.

In the apparatus shown in FIG. 8, a position detection signal obtained by detecting the position on the light-receiving unit 9 where the focusing spot is formed is input to a calculation control unit 10. The calculation control unit 10 executes a focusing operation described above and outputs a driving signal to a driving unit 11 in accordance with the defocusing amount. The focusing operation using a position detection signal is a known technique and is described in, e.g., Published Unexamined Japanese Patent Application Nos. 58-27909 and 60-42725.

Recently, along with a development in the liquid crystal industry, a demand has arisen to observe an ITO, Al, or Cr resist pattern film on the glass substrate in the process of manufacturing a liquid crystal substrate.

When the sample is like a glass substrate, the measuring beam is partly reflected by the lower surface of a glass substrate 14, as shown in FIG. 11, to generate light reflected by the lower surface. The light reflected by the lower surface behaves as if it were emitted from different points Or depending on the thickness (precisely, the refractive index is also considered) of the glass substrate 14, and is directed to the objective lens 6. The light reflected by the lower surface which is actually incident on the objective lens 6 is light up to a certain NA where the measuring beam is present.

Referring to FIG. 11, reference symbol a denotes an outer ray of the measuring beam, b, an inner ray of the measuring beam, af and bf, light reflected by the upper surface, ar and br, light reflected by the lower surface, O, an objective focal point, and Or, the virtual light-emitting point of the light reflected by the lower surface of the glass substrate 14 when the objective lens 6 is in the in-focus state.

Light reflected by the upper surface and light reflected by the lower surface are incident on the objective lens 6 and focused on the light-receiving unit 9 by the image formation lens 8. A synthetic spot of a spot So of the light reflected by the upper surface and a spot Sn of the light reflected by the lower surface is formed on the light-receiving unit 9, as shown in FIG. 12. Hence, a quantity A of light on the light-receiving unit 9 is (So+Sn), as shown in FIG. 13.

That is, the quantity of light on the light-receiving unit 9 is the synthesized quantity of the quantity of spot of light reflected by the lower surface and the quantity of spot of light reflected by the upper surface.

Therefore, the barycentric position of the synthetic spot formed on the light-receiving unit 9 is shifted from an original barycentric position Po obtained from the light reflected by the upper surface to a barycentric position Pon of the quantity of light obtained by synthesizing the two spots.

Especially, when the sample is a liquid crystal substrate, micropatterns made of materials having different reflectances are formed on the glass surface. Therefore, even if the sample is in the in-focus state, the barycentric position changes every time it is detected, and the sample is defocused every time the reflectance of the micropattern is changed.

In this manner, in the conventional automatic focusing apparatus, when a transparent thin sample is to be observed, light reflected by the lower surface of the sample is fetched by the light-receiving unit. Therefore, even if the in-focus position is obtained from the barycentric position of the light spot o the light-receiving unit, an accurate in-focus position cannot be detected.

If the sample is a transparent substrate having a uniform reflectance, correction considering reflection by the lower surface of the sample can be performed. However, if micropatterns made of materials having different reflectances, like liquid crystal patterns, are formed on the sample, it is very difficult to perform such correction.

SUMMARY OF THE INVENTION

The present invention has been made in view of the above situation, and has as its object to provide an automatic focusing apparatus which can remove light reflected by the lower surface of a transparent thin sample when the transparent thin sample is to be observed, and which can adjust the focal point at high precision even if micropatterns having different reflectances are formed on the sample, like a liquid crystal substrate.

In order to achieve the above object, the automatic focusing apparatus according to the present invention has the following arrangement. Namely, the automatic focusing apparatus for an optical system which forms an image of a transparent thin sample and in which an objective lens is disposed at a position to oppose the sample, comprises:

- a light source portion for supplying light to measure a focusing state of the optical system;
- a converting member for converting the light supplied from the light source portion into a parallel beam parallel to an optical axis of the optical system, the parallel beam being incident on an eccentric portion of a pupil of the objective lens;
- a separating member for separating light reflected by the sample from the optical system, the light reflected by the sample including light reflected by an upper surface of the sample and light reflected by a lower surface of the sample that are generated by reflecting the parallel beam, focused on the sample by the objective lens, by the upper and lower surfaces of the sample;
- a converging member, disposed on an optical path where the light reflected by the sample passes, for converging the light reflected by the upper surface of the sample and the light reflected by the lower surface of the sample at different predetermined positions;
- a light-shielding member for shielding the light reflected by the lower surface of the sample at one of a position of a converged position of the light reflected by the upper surface of the sample and a converged position of the light reflected by the lower surface of the sample; and
- a focusing state discriminating section for discriminating a focusing state of the optical system from the light reflected by the sample from which the light reflected by the lower surface of the sample is removed.

According to the present invention having the arrangement as described above, the light reflected by the lower surface of the sample is converged at a certain position on the optical path, and the light reflected by the lower surface of the sample is shielded by the light-shielding member in the vicinity of this focal point. Therefore, the light reflected by the lower surface of the sample is removed from the beam incident on a light-receiving unit.

Also, according to the present invention, the light reflected by the upper surface of the sample is converged at a certain point on the optical path, and the light reflected by the upper surface of the sample is caused to pass in the vicinity of this focal point and the light reflected by the lower surface of the sample is shielded by the light-shielding member. Therefore, the light reflected by the lower surface of the sample is removed from the beam incident on the light-receiving unit.

Also, according to the present invention, the measuring parallel beam incident on the objective lens is adjusted by a beam adjusting member to pass at such a position of the pupil and to have such a diameter that the light reflected by the lower surface of the sample will not be incident on the objective lens. Therefore, the light reflected by the lower surface of the sample will hardly be incident on the objective lens, thereby removing the light reflected by the lower surface of the sample.

BRIEF DESCRIPTION OF THE DRAWINGS

FIG. 5 is a view showing a state wherein a light-shielding plate for cutting, from the measuring beam, light close to the objective optical axis in the focusing apparatus of the first embodiment;

FIG. 6A is a view showing the arrangement of the main part of a focusing apparatus according to the second embodiment of the present invention;

FIG. 6B is a view showing the arrangement of the main part of a focusing apparatus as a modification of the second embodiment;

FIG. 7 is a view showing the main part of an embodiment in which a light-shielding member and a pinhole member for cutting light reflected by the lower surface of the sample are not provided;

FIG. 14 is a view showing the main part of a first beam adjusting optical system;

FIG. 15 is a view showing the main part of a second beam adjusting optical system; and FIG. 16 is a view showing the main part of a third beam adjusting optical system.

DETAILED DESCRIPTION OF THE PREFERRED EMBODIMENTS

The preferred embodiments of the present invention will be described below.

Figure 1:
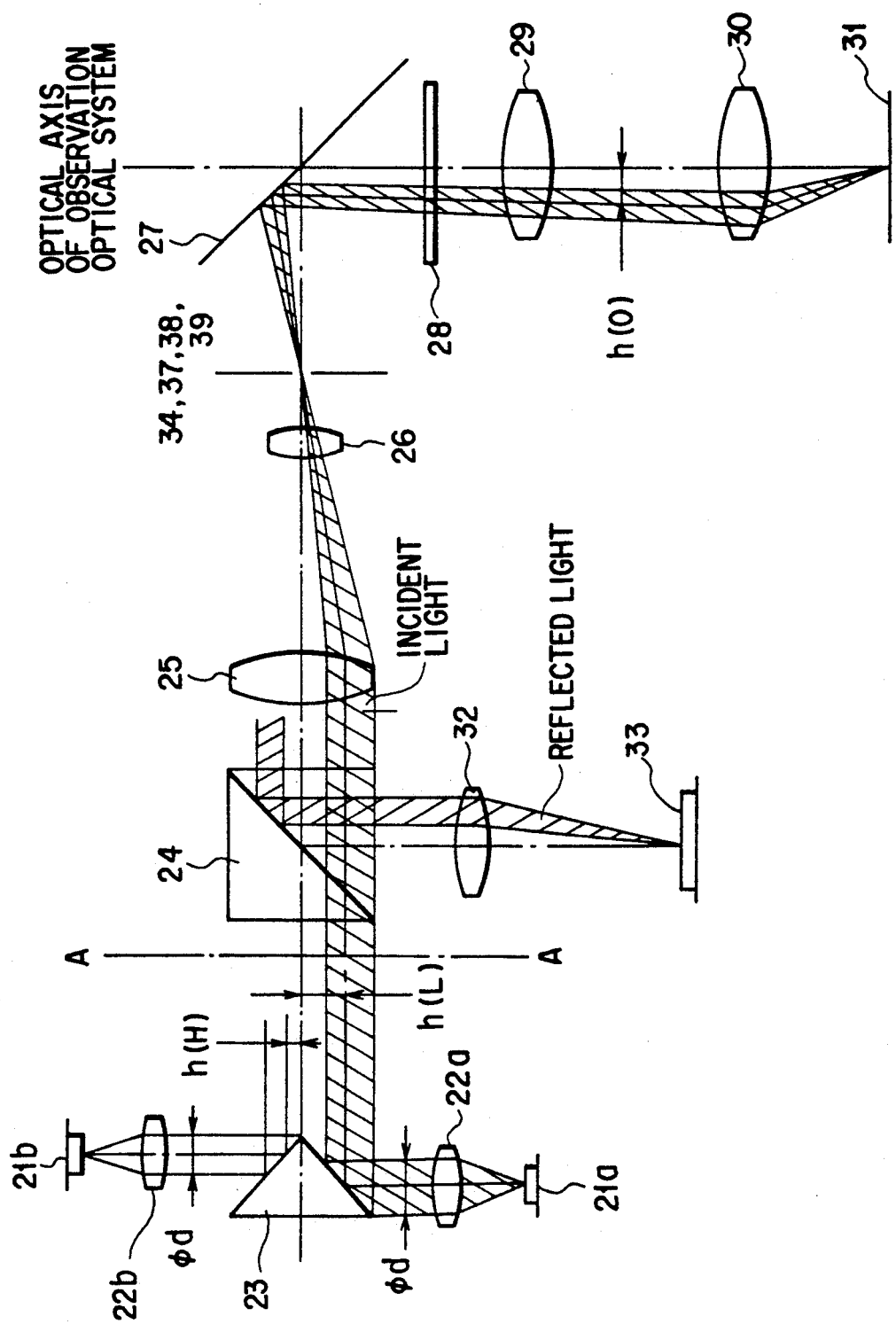
FIG. 1 is a view showing the overall arrangement of an automatic focusing apparatus according to the first embodiment of the present invention.

FIG. 1 schematically shows the optical system of an automatic focusing apparatus according to the first embodiment of the present invention. In the automatic focusing apparatus of this embodiment, the present invention is applied to a microscope whose objective lens can be switched between high and low magnifications.

In this embodiment, measuring beams emitted from low- and high-magnification light sources 21a and 21b are incident on a triangular prism mirror 23 through collimator lenses 22a and 22b, respectively, such that their optical axes are shifted from each other.

The beam reflected by the prism mirror 23 passes through a polarizing beam splitter 24, a condenser lens 25, and a variable power lens 26, and is projected to an observation optical system by a dichroic mirror 27.

The measuring beam projected to the observation optical system is incident on an objective lens 30 through a λ/4 plate 28 and an intermediate image formation lens 29, and focused on a transparent thin sample 31 through one side of the pupil of the objective lens 30.

The beam emitted from the high-magnification light source 21b passes through a pupil position close to the optical axis of the objective lens 30 when it is passed through the pupil of the objective lens 30 by the prism mirror 23. The beam emitted from the low-magnification light source 21a is passed through a pupil position far from the optical axis of the objective lens 30 by the prism mirror 23.

Light reflected by the transparent thin sample 31 and incident on the objective lens 30 passes through the intermediate image formation lens 29 and the λ/4 plate 28 to be reflected by the dichroic mirror 27. Light reflected by the dichroic mirror 27 is incident on the polarizing beam splitter 24 through the variable power lens 26 and the condenser lens 25. Light incident on the polarizing beam splitter 24 is reflected by the polarizing beam splitter 24 and focused on a position sensor 33 serving as a light-receiving unit by an image formation lens 32.

Figure 2:
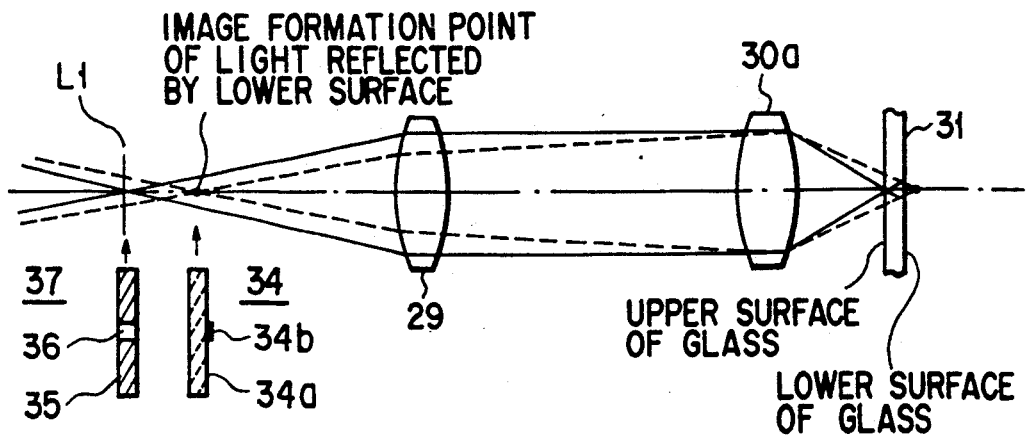
FIG. 2 is a view showing the image formation positions of upper-surface-light and lower-surface-light of the first embodiment in the low-magnification mode.

FIG. 2 shows the focal points of the reflected by the upper surface (upper-surface light) and of the light reflected by the lower surface (lower-surface light) of the sample obtained when a low-magnification objective lens 30a (e.g., 5× or 10×) is disposed on the observation optical axis of the microscope.

Light indicated by a solid line in FIG. 2 which is reflected by the upper surface of the sample is focused on an intermediate image plane L1 of the intermediate image formation lens 29, and light indicated by a broken line in FIG. 2 which is reflected by the lower surface of the sample forms an image on an optical path in front of the intermediate image plane L1.

In this embodiment, in this low-magnification mode, a light-shielding member 34 obtained by forming a light-shielding portion 34b on a translucent thin plate 34a is disposed on the image formation point of the lower surface light, so that only lower surface light of the sample is shielded by the light-shielding portion 34b.

Alternatively, a pinhole member 37 obtained by forming a pinhole 36 in a non-translucent plate 35 is disposed on the intermediate image plane L1, so that only upper surface light of the sample is passed through the pinhole 36.

Figure 3:
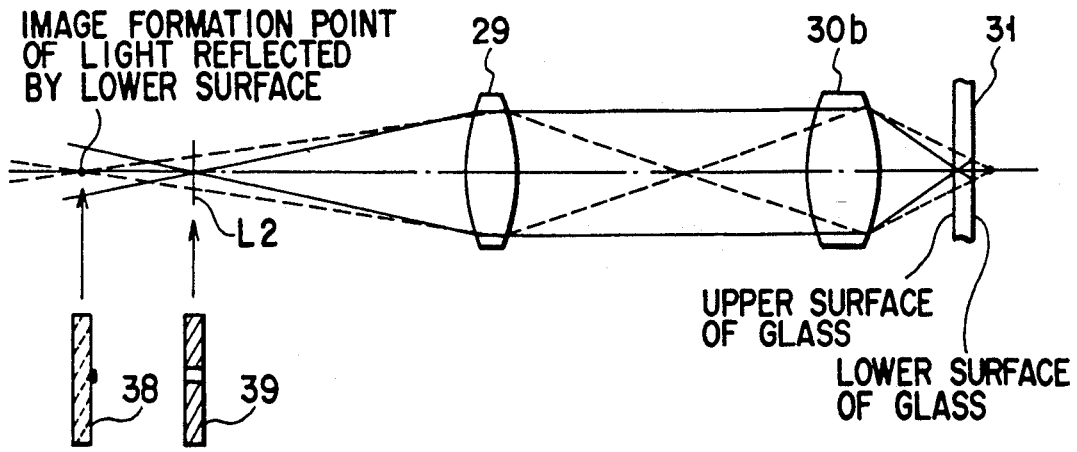
FIG. 3 is a view showing the image formation positions of upper-surface-light and lower-surface-light of the first embodiment in the high-magnification mode.

FIG. 3 shows the focal points of the upper surface light and of the lower surface light of the sample obtained when a high-magnification objective lens 30b (e.g., 50× or 100×) is disposed on the observation optical axis of the microscope.

Light indicated by a solid line in FIG. 3 which is reflected by the upper surface of the sample is focused on an intermediate image plane L2 of the intermediate image formation lens 29, and light indicated by a broken line in FIG. 3 which is reflected by the lower surface of the sample forms an image at a position farther from the intermediate image formation lens 29 than the intermediate image plane L2.

In this embodiment, in this high-magnification mode, a light-shielding member 38 constituted in the same manner as that described above is disposed on the image formation point of the lower surface light. Alternatively, a pinhole member 39 constituted in the same manner as that described above is disposed on the intermediate image plane L2.

The operation of this embodiment having the arrangement as described above will be described.

When the low-magnification objective lens 30a is used, the low magnification light source 21a is driven so that the measuring beam passes through a pupil position away from the optical axis of the low-magnification objective lens 30a and is focused on the transparent thin sample 31. Light reflected by the upper surface and light reflected by the lower surface of the transparent thin sample 31 are focused by the intermediate image formation lens 29 in states as shown in FIG. 2.

At this time, in this embodiment, the lower surface light of the sample is shielded since the light-shielding member 34 is disposed on its image formation point, and only the upper surface light of the sample is focused on the position sensor 33 by the image formation lens 32. Alternatively, the pinhole member 37 is disposed on the intermediate image plane L1, so that only the upper surface light of the sample and passing through the pinhole 36 is focused on the position sensor 33.

The operation of obtaining the in-focus position from the position detection signal output from the position sensor 33 has already been described, and its description will be omitted.

When the high-magnification objective lens 30b is used, the high-magnification light source 21b is driven so that the measuring beam is incident on the prism mirror 23. The measuring beam emitted from the high-magnification light source 21b is incident on the vicinity of the vertex of the prism mirror 23 and passes through a pupil position close to the optical axis of the high-magnification objective lens 30b. Light reflected by the upper surface and light reflected by the lower surface of the sample are focused by the intermediate image formation lens 29 in states as shown in FIG. 3.

At this time, in this embodiment, the light-shielding member 38 or pinhole member 39 is disposed on the image formation point of the lower surface light or on the intermediate image plane L2 to remove the lower surface light. Then, only light reflected by the upper surface of the sample is focused on the position sensor 33 by the image formation lens 32.

A case wherein maximum- and minimum-height rays of light reflected by the lower and upper surfaces are traced will be described when the measuring beam has a height h(L)=6 mm and a pinhole diameter φd=5.5 mm with a low-magnification objective lens being used, the measuring beam has a height h(H)=1.5 mm and a pinhole diameter φd=5.5 mm with a high-magnification objective lens being used, and the glass plate as the sample has a thickness of 1.1 mm.

Figure 4:
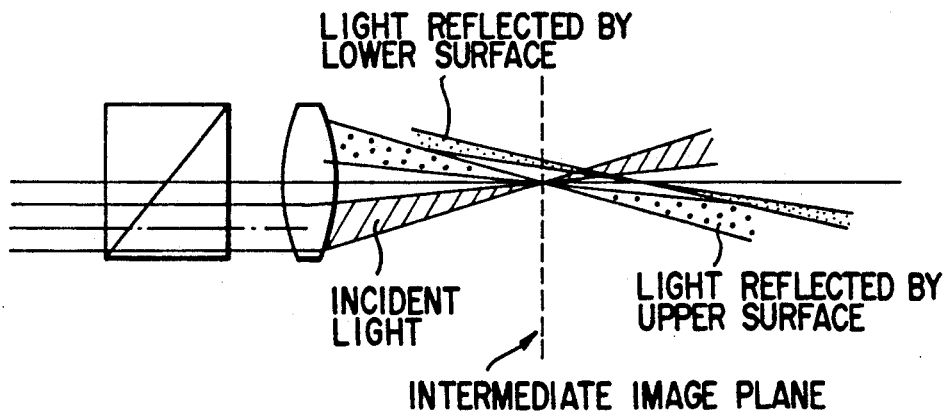
FIG. 4 is a view showing a position where a pinhole member is to be inserted in the focusing apparatus of the first embodiment.

According to the result of this case, when a 5× or 10× objective lens was used, light reflected by the upper surface of the sample was focused on the intermediate image plane, as shown in FIG. 2, and light reflected by the lower surface of the sample passes through the intermediate image plane at a certain height, as shown in FIG. 4. Hence, it suffices if a pinhole member for cutting light reflected by the lower surface of the sample is disposed on the intermediate image plane. More specifically, a 5× objective lens and a pinhole diameter of 0.4 mm or a 10× objective lens and a pinhole diameter of 1.5 mm can cut light reflected by the lower surface of the sample without decreasing light reflected by the upper surface of the sample. These pin hole diameters are sufficiently larger than the diameter of the spot formed on the intermediate image plane by light reflected by the upper surface of the sample and thus will not decrease the focus detectable range.

The ray of light obtained when a 20× objective lens was used was traced. When the height of a ray of light for a low magnification was employed, light reflected by the lower surface of the sample was almost cut without entering the aperture of the objective lens.

The ray of light obtained when 50× and 100× objective lenses was used was traced. Since the beam incident on the pupil of each objective lens included the optical axis of the objective lens, light reflected by the lower surface of the sample was slightly incident on the objective lens. However, regarding the quantity of incident light, since the ratio of light reflected by the upper surface of the sample to light reflected by the lower surface of the sample is almost 400:1, substantially no influence was caused by light reflected by the lower surface of the sample appeared.

In this manner, according to this embodiment, light reflected by the upper surface of the sample and light reflected by the lower surface of the sample are respectively focused by the intermediate image formation lens 29, and the pinhole member 39 for passing therethrough only the upper surface light of the sample is provided in the vicinity of the focal point (intermediate image plane) of light reflected by the upper surface of the sample, or the pinhole member 37 for shielding only lower surface light of the sample is provided on the image formation point of light reflected by the lower surface of the sample. Therefore, when the transparent thin sample 31 is observed, only light reflected by the lower surface of the sample 31 can be effectively removed. Hence, even if the sample is a liquid crystal substrate on which micropatterns having different reflectances are formed, focusing can be accurately adjusted without being influenced by light reflected by the lower surface of the sample.

The measuring beam is caused to pass through different locations of the pupil in accordance with the magnifications of the objective lens 30. That is, the measuring beam is shifted from the pupil center to the periphery when a low-magnification objective lens is used, and the location of the measuring beam is set closer to the pupil center when a high-magnification objective lens is used. Therefore, a shortage in NA when a low-magnification objective lens is used and a shortage in quantity of light when a high-magnification objective lens is used can be eliminated.

Considering the alignment error, the incident beam is preferably slightly away from the optical axis of the objective lens 30. Hence, as shown in FIG. 5, a light-shielding plate 41 is provided at a position on the optical axis of the objective lens 30 in the optical path from the prism mirror 23 to the objective lens 30 to shield part of high-magnification measuring beam on the side of the optical axis of the objective lens 30.

With this arrangement, focusing can be adjusted at high precision without being influenced by some alignment error.

The second embodiment of the present invention will be described with reference to FIG. 6A.

Figure 8:
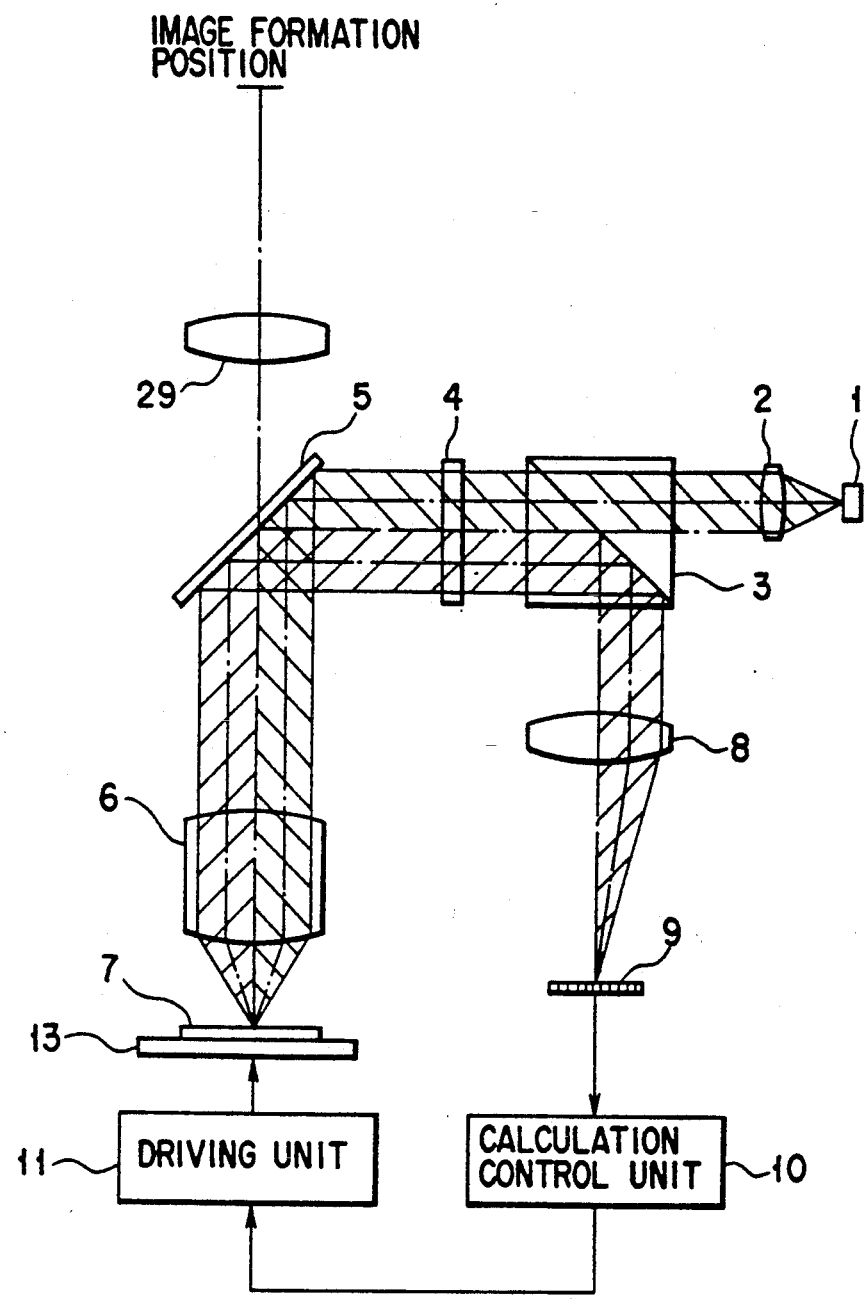
FIG. 8 is a view showing the arrangement of a conventional focusing apparatus.
Figure 9:
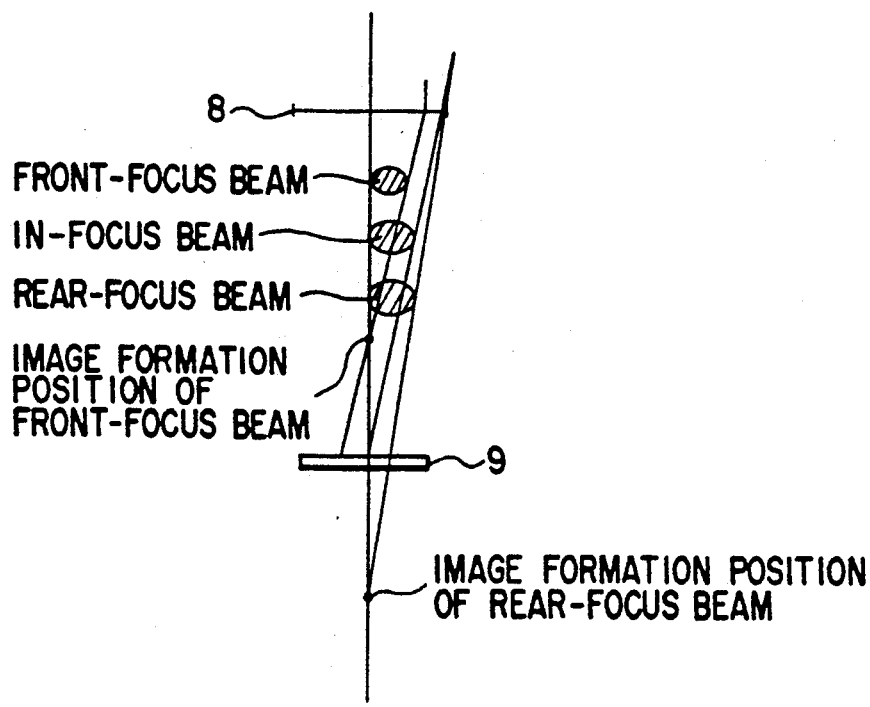
FIG. 9 is a view showing image formation states on a light-receiving unit by an image formation lens.
Figure 10A:
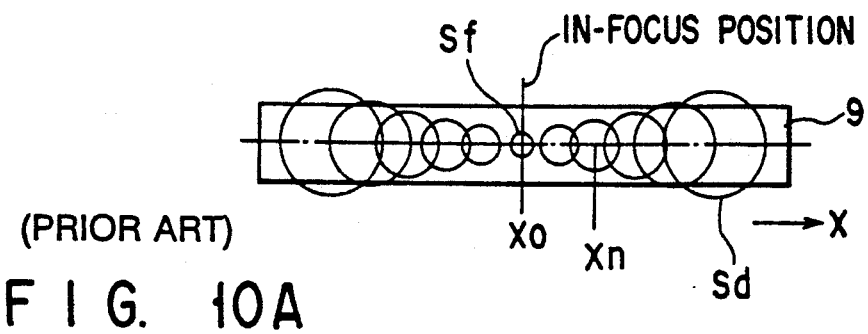
FIG. 10A is a view showing positions where spots are formed corresponding to the focusing states.
Figure 10B:
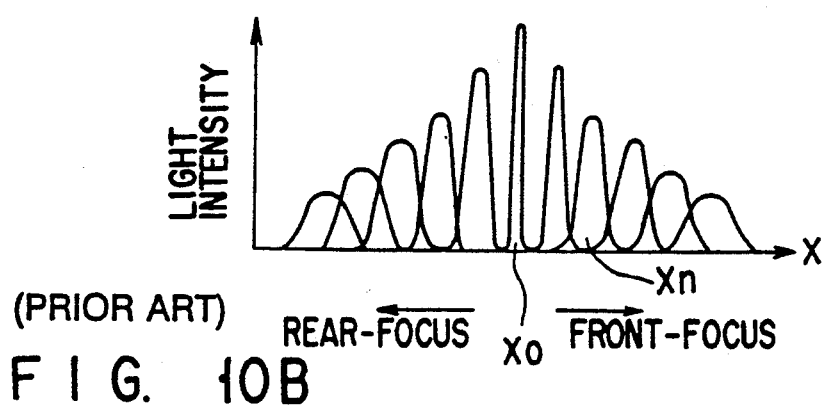
FIG. 10B is a view showing light intensities corresponding to the focusing states.
Figure 11:
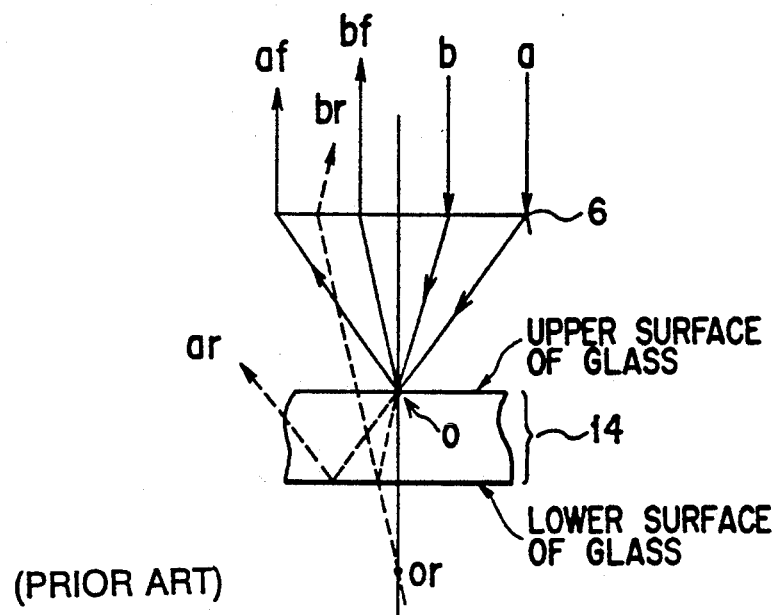
FIG. 11 is a view for explaining light reflected by the upper surface and light reflected by the lower surface of a sample.
Figure 12:
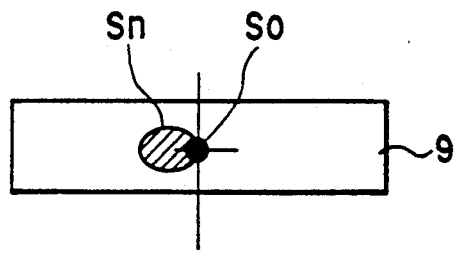
FIG. 12 is a view showing a spot formation state when light reflected by the lower surface is included in the spot.
Figure 13:
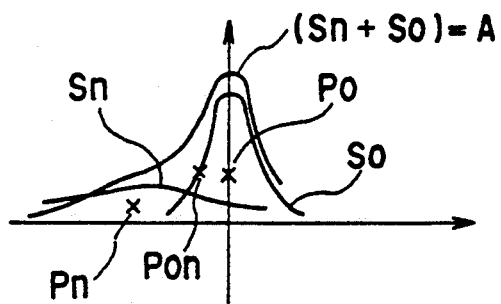
FIG. 13 is a view showing the barycenter of the spot shown in FIG. 12.

In this embodiment, the present invention is applied to the focusing apparatus shown in FIG. 8. In the first embodiment, the pinhole or light-shielding member is disposed at the image formation position where light reflected by the upper or lower surface of the sample forms an image by the intermediate image formation lens 29. In the second embodiment, a pinhole or light-shielding member is disposed at the image formation position where light reflected by the upper or lower surface of the sample forms an image by the image formation point of an image formation lens 8.

In the in-focus state shown in FIG. 6A, light reflected by the upper surface of the sample is focused on the light-receiving surface of a light-receiving unit 9, and light reflected by the lower surface of the sample is front-focused. In this embodiment, a light-shielding member 42 for shielding only light reflected by the lower surface of the sample is disposed on the focal point of light reflected by the lower surface of the sample, or a pinhole member 43 having a pinhole with a diameter slightly larger than the spot diameter of the upper surface light of the sample is disposed on the focal point, on the light-receiving unit 9, of light reflected by the upper surface of the sample.

With this arrangement, light reflected by the lower surface of the sample can also be cut, and only light reflected by the upper surface of the sample can be focused on the light-receiving unit 9. Therefore, focal noise caused by light reflected by the lower surface of the sample can be removed, thereby realizing high-precision automatic focusing.

After light forms an image by the image formation lens 8, light may be focused on the light-receiving unit 9 by a convex lens 44, as shown in FIG. 6B. In this case, a light-shielding or pinhole member 42 or 43 is disposed at the image formation position of the image formation lens 8.

In the first and second embodiments described above, light reflected by the lower surface of the sample is cut by the light-shielding or pinhole member. However, if the diameter and pupil incident position of the measuring beam are set in a state as shown in FIG. 7, light reflected by the lower surface of the sample will be caused to be hardly incident on the position sensor (PSD) 33.

More specifically, referring to FIG. 7, when the measuring beam is defined in the range of a to b, the minimum aperture (aperture of the objective lens) in the optical path will cut light reflected by the lower surface of the sample.

Referring to FIG. 7, reference symbol a denotes the maximum ray of the measuring beam; b, the maximum ray of the measuring beam on the side of the optical axis of the objective lens; afo and bfo, light reflected by the upper surface of the sample., 0, a focal point of the objective lens; and Or, a virtual light-emitting point of light reflected by the lower surface of the glass substrate when the objective lens is in-focused.

The pupil incident position and bundle diameter of such a measuring beam can be calculated from the size of the pupil of the objective lens, NA, and the thickness (virtual light-emitting point) of the transparent thin sample.

Such a measuring beam can be obtained by providing, in the optical path from the light source to the objective lens, a light-shielding plate which shields light of the measuring beam on the side of the optical axis of each objective lens by a quantity corresponding to each objective lens. Alternatively, an aperture for realizing such a measuring beam may be provided in the optical path from the light source to the objective lens.

FIGS. 14 to 16 show the practical arrangements of this embodiment. More specifically, a parallel glass plate 51 serving as the light-shielding plate is obliquely inserted in the reflection-side optical path of the prism mirror 23, as shown in FIG. 14. The parallel glass plate 51 serves to shift the parallel beam away from the optical axis. As a result, the beam on the side of the objective optical axis disappears.

The beam shown in FIG. 7 can also be generated by shifting the prism mirror 23 toward the opticals axis, as shown in FIG. 15.

Also, an aperture member 52 may be inserted in the reflection-side optical path of the mirror 23, as shown in FIG. 16.

According to this embodiment, light reflected by the lower surface of the sample can be removed without using a light-shielding or pinhole member.

The present invention is not limited to the respective embodiments and a modification described above, and various modifications may be made without departing from the spirit and scope of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An automatic focusing apparatus for an optical system which forms an image of a transparent thin sample and in which an objective lens is disposed at a position to oppose the sample, comprising:

light source means for supplying light to measure a focusing state of said optical system;

converting means for converting the light supplied from said light source means into a parallel beam parallel to an optical axis of said optical system, the parallel beam being incident on an eccentric portion of a pupil of said objective lens;

separating means for separating light reflected by the sample from said optical system, the light reflected by the sample including light reflected by an upper surface of the sample and light reflected by a lower surface of the sample that are generated by reflecting the parallel beam, focused on the sample by said objective lens, by the upper and lower surfaces of the sample;

coverging means, disposed on an optical path where the light reflected by the sample passes, for converging the light reflected by the upper surface of the sample and the light reflected by the lower surface of the sample at different predetermined positions;

light-shielding means for shielding only the light reflected by the lower surface of the sample at one of the positions of a converged position of the light reflected by the upper surface of the sample and a converged position of the light reflected by the lower surface of the sample; and focusing state discriminating means for discriminating a focusing state of said optical system according to the light reflected by the sample from which the light reflected by the lower surface of the sample is removed.

2. An apparatus according to claim 1, wherein said light-shielding means comprises a light-shielding member disposed on the converged position of the light reflected by the upper surface of the sample and having a pinhole for transmitting therethrough the light reflected by the upper surface of the sample, and a light-shielding surface, formed around the pinhole, for shielding the light reflected by the lower surface of the sample.

3. An apparatus according to claim 1, wherein said light-shielding means comprises a light-shielding member disposed on the converged position of the light reflected by the lower surface of the sample and having a light-shielding portion for shielding the light reflected by the lower surface of the sample and a light-transmitting surface, formed around said light-shielding portion, for transmitting therethrough the light reflected by the upper surface of the sample.

4. An apparatus according to claim 1, wherein said converging means includes an intermediate image formation lens disposed on the optical path of said optical system.

5. An apparatus according to claim 1, wherein said converging means includes an image formation lens for converging the light reflected by the upper surface of the sample and the light reflected by the lower surface of the sample, that are separated from said optical system by said separating means, at different predetermined positions.

6. An apparatus according to claim 1, wherein said focusing state discriminating means includes light-receiving means, having a light-receiving surface at near the focal position of the light reflected by the upper surface of the sample, for converting the focal position on said light-receiving surface of the light reflected by the upper surface of the sample into a position signal, and data processing means for receiving the position signal from said light-receiving means and for discriminating the focusing state of said optical system according to the position signal.

7. An apparatus according to claim 6, wherein said light-shielding means comprises a light-shielding member disposed on said light-receiving surface and having a pinhole formed at the focal position of the light reflected by the upper surface of the sample, and a light-shielding surface around the pinhole.

8. An apparatus according to claim 6, wherein said converging means converges, on said light-receiving surface, the light reflected by the upper surface of the sample, and converges the light reflected by the lower surface of the sample at a position before said light-receiving surface, and said light-shielding means comprises a light-shielding member disposed on the converged position of the light reflected by the lower surface of the sample and having a light-shielding portion for shielding the light reflected by the lower surface of the sample and a light-transmitting surface, formed around said light-shielding portion, for transmitting therethrough the light reflected by the upper surface of the sample.

9. An apparatus according to claim 1, wherein:

said light source means includes a first light source section corresponding to an objective lens having a high magnification, and a second light source section corresponding to an objective lens having a low magnification, and said converting means causes light emitted from said first light source section to be incident on a portion of the pupil of said objective lens disposed in said optical system closer to said optical axis, and causes light emitted from said second light source section to be incident on a portion of the pupil of said objective lens farther from the optical axis than a light emitted from said first light source section.

10. An apparatus according to claim 9, wherein said converting means includes:

a first collimator lens for converting the light supplied from said first light source section into a parallel beam having a predetermined diameter, a second collimator lens for converting the light supplied from said second light source section into a parallel beam having a predetermined diameter, a two-surface mirror having a first reflecting surface on which the parallel beam supplied from said first collimator lens is incident, and a second reflecting surface on which the parallel beam supplied from said second collimator lens is incident, and a dichroic mirror, disposed on the optical axis of said optical system, for causing parallel bundles of rays incident thereon from said two-surface mirror to be incident on said pupil of said objective lens to be parallel to the optical axis of said optical system.

11. An apparatus according to claim 10, wherein said converting means further includes a light-shielding member for shielding a light in the vicinity of the optical axis.

12. An automatic focusing apparatus for an optical system which forms an image of a transparent thin sample and in which an objective lens is disposed at a position to oppose the sample, comprising:

light source means for supplying light to measure a focusing state of said optical system;

converting means for converting the light supplied from said light source into a parallel beam parallel to an optical axis of said optical system, the parallel beam being incident on an eccentric portion of a pupil of said objective lens;

separating means for separating light reflected by an upper surface of the sample from said optical system, the light reflected by the upper surface of the sample being generated by reflecting the parallel beam, focused on the sample by said objective lens, by an upper surface of the sample;

beam adjusting means for setting a diameter of the parallel beam and a pupil passing position thereof so that light reflected by a lower surface of the sample will not be incident on said objective lens; and focusing state discriminating means for discriminating a focusing state of said optical system according to the light reflected by the upper surface of the sample which does not include the light reflected by the lower surface of the sample.

* * * * *